United States Patent
Santoli et al.

[11] Patent Number: 5,488,917
[45] Date of Patent: Feb. 6, 1996

[54] LAWN SEEDING MACHINE

[76] Inventors: Domenico Santoli, 2 Clark Pl., W. Harrison, N.Y. 10604; George Spector, 233 Broadway Rm 702, New York, N.Y. 10279

[21] Appl. No.: 239,589

[22] Filed: May 9, 1994

[51] Int. Cl.$^6$ .................................................. A01C 5/04
[52] U.S. Cl. ................... 111/91; 111/90; 172/21
[58] Field of Search ................... 172/21; 111/89, 111/90, 91

[56] References Cited

U.S. PATENT DOCUMENTS

| | | | |
|---|---|---|---|
| 1,914,915 | 6/1933 | Handler | 111/89 X |
| 2,690,145 | 9/1954 | Romain | 111/91 |
| 3,220,370 | 11/1965 | Smith | 111/91 X |
| 4,023,511 | 5/1977 | Newman | 111/89 |
| 4,261,270 | 4/1981 | Nichols | 111/89 |
| 4,444,130 | 4/1984 | Ray | 111/89 X |
| 5,205,228 | 4/1993 | Mitchell | 111/89 |
| 5,359,948 | 11/1994 | Makkink | 111/89 X |

FOREIGN PATENT DOCUMENTS

| | | | |
|---|---|---|---|
| 722512 | 3/1980 | U.S.S.R. | 111/89 |
| 1424755 | 9/1988 | U.S.S.R. | 111/89 |

*Primary Examiner*—Randolph A. Reese
*Assistant Examiner*—Christopher J. Novosad

[57] ABSTRACT

A lawn seeding machine is provided, which consists of a trough for holding grass seeds therein. An inverted U-shaped handle extends upwardly form the trough. A plurality of L-shaped tubular ducts extend in spaced intervals downwardly from the trough. A plurality of spiked seeding wheels are also provided, with each pivotally mounted onto an end of one L-shaped tubular duct. When the spiked seeding wheels are manually pushed along the ground, they will rotate to make holes in the ground and at the same time drop grass seeds directly into the holes received from the trough and one L-shaped tubular duct in a single pass operation.

3 Claims, 1 Drawing Sheet ized apertures. The seed container 28 is mounted to one side of the hub 24, so that the bent spikes 26 will be in an alignment with the apertures 30. Ring bearing 32 is through the center of the seed container 28, so as to engage with the end of one L-shaped tubular duct 18, for rotation thereabout.

LAWN SEEDING MACHINE

BACKGROUND OF THE INVENTION

The instant invention relates generally to agricultural implements and more specifically it relates to a lawn seeding machine, which provides a mechanism that will make holes in the ground and at the same time drop grass seeds directly into the holes.

There are available various conventional agricultural implements which do not provide the novel improvements of the invention herein disclosed.

SUMMARY OF THE INVENTION

A primary object of the present invention is to provide a lawn seeding machine that will overcome the shortcomings of the prior art devices.

Another object is to provide a lawn seeding machine having a plurality of spiked seeding wheels, that when manually pushed along the ground will make holes in the ground and at the same time drop grass seeds directly into the holes in a single pass operation.

An additional object is to provide a lawn seeding machine that when manually pushed along the ground will automatically adjust to variations in the terrain, so that the spiked seeding wheels can move up and down, as well as rotate on the ground.

A further object is to provide a lawn seeding machine that is simple and easy to use.

A still further object is to provide a lawn seeding machine that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
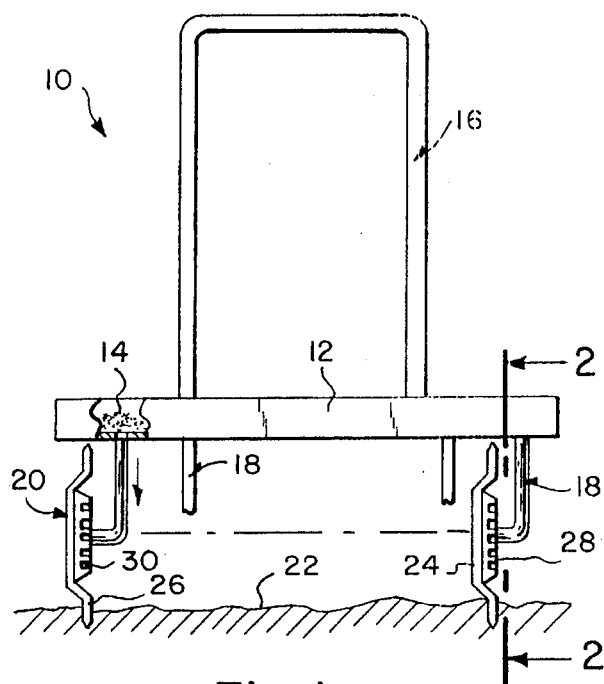
FIG. 1 is a front elevational view with parts broken away and in section of a first embodiment of the instant invention.
Figure 2:
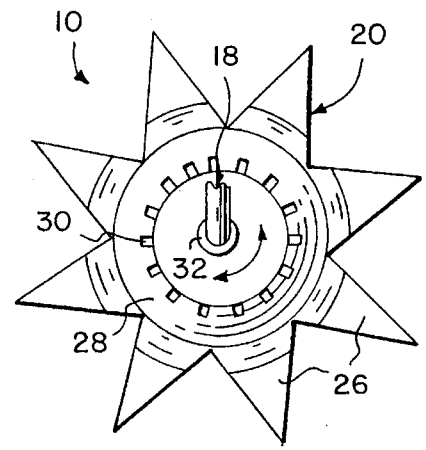
FIG. 2 is a side view of the spike wheel feeder taken along line 2—2 in FIG. 1.
Figure 3:
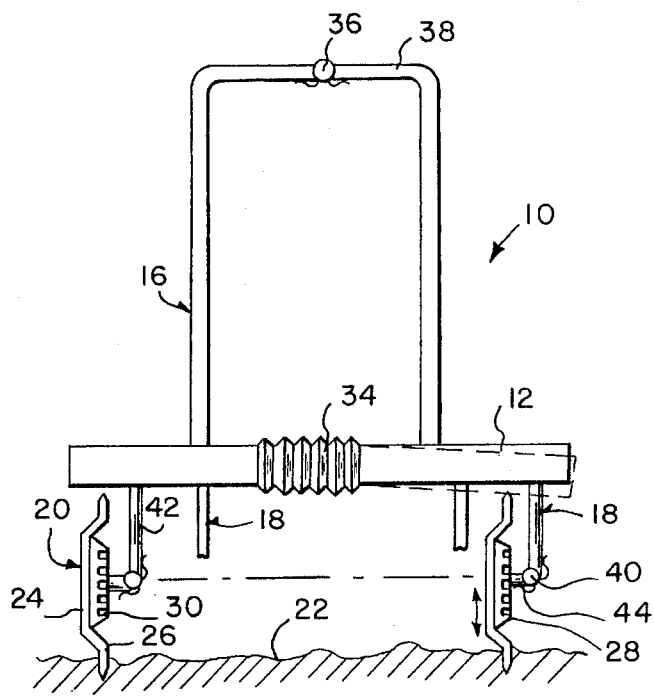
FIG. 3 is a front elevational view of a second embodiment being adjustable to variations in the terrain, so that the spike wheel feeders can move up and down, as well as rotate thereabout.

Turning now descriptively to the drawings, in which similar reference characters denote similar elements throughout the several views, FIGS. 1 through 3 illustrate a lawn seeding machine 10, which consists of a trough 12 for holding grass seeds 14 therein. An inverted U-shaped handle 16 extends upwardly from the trough 12. A plurality of L-shaped tubular ducts 18 extend in spaced intervals downwardly from the trough 12. A plurality of spiked seeding wheels 20 are also provided, with each rotatably mounted by a ring bearing 32 into an end of one L-shaped tubular duct 18. When the spiked seeding wheels 20 are manually pushed along the ground 22, they will rotate to make holes in the ground 22 and at the same time drop grass seeds 14 directly into the holes received from the trough 12 and one L-shaped tubular duct 18 in a single pass operation.

Each spiked seeding wheel 20 includes a hub 24 having a plurality of radially positioned bent spikes 26. A seed container 28 has a plurality of radially positioned apertures 30. The seed container 28 is mounted to one side of the hub 24, so that the bent spikes 26 will be in an alignment with the apertures 30. Ring bearing 32 is through the center of the seed container 28, so as to engage with the end of one L-shaped tubular duct 18, for rotation thereabout.

The lawn seeding machine 10 in FIG. 3, further includes components for automatically adjusting to variations in the terrain, so that the spiked seeding wheels 20 can move up and down, as well as rotate on the ground 22. The adjusting components consists of the trough 12 having a flexible portion 34 approximately midway. The inverted U-shaped handle 16 has a spring biased pivot connection 36, approximately midway in its upper hand grip portion 38. Each L-shaped tubular duct 18 has a spring biased pivot connection 40 at a juncture between its long segment 42 and its short segment 44.

OPERATION OF THE INVENTION

To use the lawn seeding machine 10, a person simply places the grass seeds 14 within the trough 12. the handle 16 is then gripped and pushed, so that the spiked seeding wheels 20 will rotate along the ground 22. The bent spikes 26 will make holes in the ground 22, while the grass seeds 14 in the seed container 28 will fall out of the apertures 30 into the holes directly below. The lawn seeding machine 10 in FIG. 3, is used in the same way. The flexible portion 34 in the trough 12, the spring biased pivot connection 36 in the handle 16 and the spring biased pivot connections 4 in the ducts 18 will allow the spiked seeding wheels 20 to move up and down, as well as rotate on the ground 22.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A lawn seeding machine which comprises:

a) a trough for holding grass seeds therein;

b) an inverted U-shaped handle extending upwardly from said trough;

c) a plurality of L-shaped tubular ducts extending in spaced intervals downwardly from said trough;

d) a plurality of spiked seeding wheels, each rotatably mounted by a ring bearing onto an end of one said L-shaped tubular duct, so that when said spiked seeding wheels are manually pushed along the ground, they will rotate to make holes in the ground and at the same time drop grass seeds directly into the holes received from said trough and said L-shaped tubular ducts in a single pass operation; wherein each said spiked seeding wheel includes:

e) a hub having a plurality of radially positioned bent spikes;

f) a seed container having a plurality of radially positioned apertures, said seed container mounted to one side of said hub, so that said bent spikes will be in an alignment with the apertures; and g) said ring bearing extending through the center of said seed container, so as to engage with the end of one said L-shaped tubular duct for rotation thereabout.

2. A lawn seeding machine as recited in claim 1, further including means for automatically adjusting to variations in the terrain, so that said spiked seeding wheels can move up and aown, as well as rotate on the ground.

3. A lawn seeding machine as recited in claim 2, wherein said adjusting means includes:

a) said trough having a flexible portion approximately midway;

b) said inverted U-shaped handle having a spring biased pivot connection approximately midway in its upper hand grip portion and c) each said L-shaped tubular duct having a spring biased pivot connection at a juncture between its long segment and its short segment.

* * * * *